(12) United States Patent
Quintero Ramirez et al.

(10) Patent No.: US 11,288,367 B2
(45) Date of Patent: Mar. 29, 2022

(54) SCANNING FILES USING ANTIVIRUS SOFTWARE

(71) Applicant: Virustotal SLU, Dublin (IE)

(72) Inventors: Jose Bernardo Quintero Ramirez, Malaga (ES); Julio Canto, Malaga (ES); Alejandro Bermudez, Malaga (ES)

(73) Assignee: Google LLC, Mountain View, CA (US)

( * ) Notice: Subject to any disclaimer, the term of this patent is extended or adjusted under 35 U.S.C. 154(b) by 567 days.

(21) Appl. No.: 15/920,090

(22) Filed: Mar. 13, 2018

(65) Prior Publication Data

US 2018/0268138 A1 Sep. 20, 2018

(30) Foreign Application Priority Data

Mar. 14, 2017 (EP) ..................................... 17382131

(51) Int. Cl.
*G06F 21/56* (2013.01)
*H04L 29/06* (2006.01)
*G06F 16/178* (2019.01)

(52) U.S. Cl.
CPC .......... *G06F 21/561* (2013.01); *G06F 16/178* (2019.01); *G06F 21/562* (2013.01); *G06F 21/564* (2013.01); *G06F 21/567* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 6,748,534 B1 | 6/2004 | Gryaznov et al. | |
| 8,302,192 B1 * | 10/2012 | Cnudde | H04L 63/145 726/22 |
| 8,955,138 B1 * | 2/2015 | Mahadik | G06F 21/55 726/22 |
| 9,219,707 B1 * | 12/2015 | Mesropian | H04L 63/1408 |

(Continued)

OTHER PUBLICATIONS

International Search Report and Written Opinion issued in International Application No. PCT/EP2018/0562058, dated Apr. 20, 2018, 13 pages.

(Continued)

*Primary Examiner* — Jason Chiang
(74) *Attorney, Agent, or Firm* — Fish & Richardson P.C.

(57) ABSTRACT

In some implementations, a method includes receiving files provided for analysis by users, generating, from the received files, a batch including multiple files, and scanning each of the files in the batch using each of multiple different antivirus software programs to generate an antivirus output for each of the files. The scanning includes, for each of multiple computing units, generating a replica of the batch for the computing unit, and scanning, by the computing unit, each file in the replica of the batch using an antivirus software program assigned to the computing unit to generate a respective program-specific antivirus output for the antivirus software program for each file of the batch of files. The method includes generating, for each file in the batch, the antivirus output for the file from the program-specific antivirus outputs for the file, and outputting the generated antivirus outputs for presentation to the users.

20 Claims, 5 Drawing Sheets

(56) References Cited

U.S. PATENT DOCUMENTS

| | | | | |
|---|---|---|---|---|
| 9,756,070 B1* | 9/2017 | Crowell | ............. | G06F 9/45533 |
| 2007/0283439 A1* | 12/2007 | Ballard | ................ | G06F 21/562 |
| | | | | 726/24 |
| 2008/0313733 A1* | 12/2008 | Kramer | ................ | H04L 63/145 |
| | | | | 726/22 |
| 2009/0044024 A1* | 2/2009 | Oberheide | ........... | G06F 21/562 |
| | | | | 713/188 |
| 2009/0282485 A1* | 11/2009 | Bennett | .................. | G06F 21/51 |
| | | | | 726/24 |
| 2011/0072514 A1* | 3/2011 | Gilder | ................ | G09G 3/3208 |
| | | | | 726/22 |
| 2012/0297486 A1* | 11/2012 | Turbin | ................ | G06F 21/562 |
| | | | | 726/24 |
| 2013/0019306 A1* | 1/2013 | Lagar-Cavilla | ....... | G06F 21/566 |
| | | | | 726/22 |
| 2013/0247167 A1* | 9/2013 | Paul | ........................ | H04L 63/20 |
| | | | | 726/11 |
| 2013/0269028 A1* | 10/2013 | Nakawatase | ........ | H04L 63/1433 |
| | | | | 726/22 |
| 2014/0165203 A1* | 6/2014 | Friedrichs | ............. | G06F 21/552 |
| | | | | 726/24 |
| 2014/0181975 A1* | 6/2014 | Spernow | ............... | G06F 21/552 |
| | | | | 726/23 |
| 2014/0304818 A1* | 10/2014 | Li | ........................ | G06F 21/568 |
| | | | | 726/24 |
| 2015/0331905 A1* | 11/2015 | Brand | ................. | H04L 67/1095 |
| | | | | 707/770 |

OTHER PUBLICATIONS

Extended European Search Report issued in European Application No. 17382131.5, dated Aug. 25, 2017, 7 pages.

PCT International Preliminary Report on Patentability issued in International Application No. PCT/EP2018/0562058, dated Sep. 26, 2019, 8 pages.

EP Office Action in European Application No. 17382131, dated Apr. 6, 2020, 4 pages.

* cited by examiner

SCANNING FILES USING ANTIVIRUS SOFTWARE

CROSS REFERENCE TO RELATED APPLICATION

This patent application claims priority under 35 U.S.C § 119 to European Patent Application No. 17382131.5, filed Mar. 14, 2017, the entire contents of which are incorporated herein by reference.

BACKGROUND

This specification generally relates to scanning files using antivirus software programs. Antivirus software programs scan files to detect malware using various detection techniques and algorithms. The management of the scanning process for multiple files affects the efficiency and processing time of the files.

SUMMARY

Malware often disrupts computer operations and gathers private or sensitive information of users or organizations without permission. Antivirus software is used to detect malware. Different antivirus software may use different detection techniques and algorithms; in some examples, a malware file may be detected by one antivirus program and not by a different antivirus program. By analyzing a file using multiple different antivirus software programs, both false negatives in which malicious content is not detected and false positives in which innocuous content is flagged may be reduced. In this way, the reliability of malware detection, and subsequent removal if required, may be increased.

Scanning one file using multiple antivirus programs is resource intensive, and when scanning a file and downloading the next file to be scanned are performed sequentially, a latency is incurred for each file scanned. The delay is a result of an initial matching of malware signatures to each file, in addition to the downtime accrued between completing analysis of a first file and initializing scanning of the next file. By requesting and downloading batches of multiple files during the scan cycle of a previous batch, the delay is spread across multiple files and multiple antivirus programs, reducing the overall wait time. Additionally, the need to increase processing resources to deal with transitory spikes in the number of files to be scanned can be mitigated by grouping files into batches, thereby leveling the number of files to be scanned and spreading the processing load over a period of time. Further increases in efficiency can be achieved by running the multiple different antivirus programs in parallel. The batches of files to be processed can be replicated for each antivirus program, and can be scanned by multiple antivirus programs simultaneously.

In one general implementation, a file analysis system distributes work among multiple computing units working in parallel. The system receives files to be processed in real-time, and divides the files into batches to be processed sequentially. Each of the multiple computing units runs a different antivirus program, and the batches are replicated for each of the multiple computing units, stored in a memory accessible by the multiple computing units, and subsequently downloaded by each of the multiple computing units. Each of the multiple computing units processes a batch of files by scanning for malicious content using an antivirus program. Each of the multiple computing units requests a next batch to be downloaded and replicated while scanning of the current batch is ongoing. The results of the parallel analysis are then output to a user of the file analysis system.

In general, one innovative aspect of the subject matter described in this specification can be embodied in a method that includes distributing processing in a file analysis system that includes multiple computing units. The method includes receiving files provided for analysis by users, generating, from the received files, a batch including multiple files, and scanning each of the files in the batch using each of multiple antivirus software programs to generate an antivirus output for each of the files. Generating the antivirus output for each of the files includes, for each of the computing units, generating a replica of the batch for the computing unit, scanning, by the computing unit, each file in the replica of the batch using an antivirus software program assigned to the computing unit to generate a respective program-specific antivirus output for the antivirus software program for each file of the batch of files, and generating, by the file analysis system and for each file in the batch, the antivirus output for the file from the program-specific antivirus outputs for the file. The method also includes outputting the generated antivirus outputs for presentation to the users.

Implementations may include one or more of the following features. For example, the computing units can be processor cores. In some implementations, scanning each of the files in the batch using each of a plurality of antivirus software programs to generate an antivirus output for each of the files includes, for each of the computing units, requesting, by the computing unit and while the computing unit is scanning the replica of the batch, a replica of a next batch of files different from the batch.

In some implementations, scanning, by the computing unit, each file in the replica of the batch using an antivirus software program assigned to the computing unit to generate a respective program-specific antivirus output for the antivirus software program for each file of the batch of files includes downloading the replica of the batch to the computing unit, and requesting, by the computing unit and while the computing unit is scanning the replica of the batch, a replica of a next batch of files different from the batch includes requesting in response to determining that the downloading of the replica of the batch has finished.

In some implementations, the next batch of files is generated from files in a queue generated by the file analysis system. In some implementations, a number of the computing units is less than a number of the antivirus software programs, and scanning each of the files in the batch using each of the antivirus software programs to generate a respective antivirus output for each of the files, includes, for a particular computing unit, after scanning, by the particular computing unit, using the antivirus software program assigned to the computing unit, scanning, by the particular computing unit, each file in the replica of the batch using a second antivirus software program assigned to the computing unit different from the antivirus software program assigned to the computing unit to generate a respective program-specific antivirus output for the second antivirus software program for each file of the batch of files.

In some implementations, a memory of the file analysis system is a volatile memory, wherein the replica of the batch for the computing unit is stored in the volatile memory, and wherein scanning, by the computing unit, each file in the replica of the batch using an antivirus software program assigned to the computing unit to generate a respective program-specific antivirus output for the antivirus software program for each file of the batch of files includes accessing, from the volatile memory of the file analysis system, the replica of the batch for the computing unit, and scanning, by the computing unit, each file in the replica of the batch using the antivirus software program assigned to the computing unit to generate a respective program-specific antivirus output.

In some implementations, the received files are stored in a memory of the file analysis system different from the volatile memory. In some implementations, the program-specific antivirus output includes, for each file and for each antivirus program, an antivirus verdict generated by the antivirus program, and metadata characterizing the antivirus verdict.

Another innovative aspect of the subject matter described in this specification can be embodied in a file analysis system that includes one or more computers, and one or more storage devices storing instructions that when executed by the one or more computers cause the one or more computers to perform operations. These operations include receiving files provided for analysis by users, generating, from the received files, a batch including multiple files, and scanning each of the files in the batch using each of multiple antivirus software programs to generate an antivirus output for each of the files. Generating the antivirus output for each of the files includes, for each of the computing units, generating a replica of the batch for the computing unit, scanning, by the computing unit, each file in the replica of the batch using an antivirus software program assigned to the computing unit to generate a respective program-specific antivirus output for the antivirus software program for each file of the batch of files, and generating, by the file analysis system and for each file in the batch, the antivirus output for the file from the program-specific antivirus outputs for the file. The operations also include outputting the generated antivirus outputs for presentation to the users.

Implementations may include one or more of the following features. For example, the computing units can be processor cores. In some implementations, scanning each of the files in the batch using each of a plurality of antivirus software programs to generate an antivirus output for each of the files includes, for each of the computing units, requesting, by the computing unit and while the computing unit is scanning the replica of the batch, a replica of a next batch of files different from the batch.

In some implementations, scanning, by the computing unit, each file in the replica of the batch using an antivirus software program assigned to the computing unit to generate a respective program-specific antivirus output for the antivirus software program for each file of the batch of files includes downloading the replica of the batch to the computing unit, and requesting, by the computing unit and while the computing unit is scanning the replica of the batch, a replica of a next batch of files different from the batch includes requesting in response to determining that the downloading of the replica of the batch has finished.

In some implementations, the next batch of files is generated from files in a queue generated by the file analysis system. In some implementations, a number of the computing units is less than a number of the antivirus software programs, and scanning each of the files in the batch using each of the antivirus software programs to generate a respective antivirus output for each of the files, includes, for a particular computing unit, after scanning, by the particular computing unit, using the antivirus software program assigned to the computing unit, scanning, by the particular computing unit, each file in the replica of the batch using a second antivirus software program assigned to the computing unit different from the antivirus software program assigned to the computing unit to generate a respective program-specific antivirus output for the second antivirus software program for each file of the batch of files.

In some implementations, a memory of the file analysis system is a volatile memory, wherein the replica of the batch for the computing unit is stored in the volatile memory, and wherein scanning, by the computing unit, each file in the replica of the batch using an antivirus software program assigned to the computing unit to generate a respective program-specific antivirus output for the antivirus software program for each file of the batch of files includes accessing, from the volatile memory of the file analysis system, the replica of the batch for the computing unit, and scanning, by the computing unit, each file in the replica of the batch using the antivirus software program assigned to the computing unit to generate a respective program-specific antivirus output.

In some implementations, the received files are stored in a memory of the file analysis system different from the volatile memory. In some implementations, the program-specific antivirus output includes, for each file and for each antivirus program, an antivirus verdict generated by the antivirus program, and metadata characterizing the antivirus verdict.

Another innovative aspect of the subject matter described in this specification can be embodied in one or more non-transitory computer readable media storing instructions that when executed by one or more computers cause the one or more computers to perform operations. These operations include receiving files provided for analysis by users, generating, from the received files, a batch including multiple files, and scanning each of the files in the batch using each of multiple antivirus software programs to generate an antivirus output for each of the files. Generating the antivirus output for each of the files includes, for each of the computing units, generating a replica of the batch for the computing unit, scanning, by the computing unit, each file in the replica of the batch using an antivirus software program assigned to the computing unit to generate a respective program-specific antivirus output for the antivirus software program for each file of the batch of files, and generating, by the file analysis system and for each file in the batch, the antivirus output for the file from the program-specific antivirus outputs for the file. The operations also include outputting the generated antivirus outputs for presentation to the users.

In some implementations, the computing units are computer cores.

The subject matter described in this specification can be implemented in particular embodiments so as to realize one or more of the following advantages. The disclosed system can accommodate changes in throughput of files provided by users for scanning by using batching to execute a series of antivirus scanning jobs without user intervention. By creating batches from the files provided by users and processing the batches of files by scanning each file in the batches with multiple different antivirus software programs to detect malicious content, the system can shift the time of processing of each batch of files based on the availability of computing resources. Program-specific antivirus outputs for multiple different antivirus software programs can be provided to users with reduced latency even when users provide large numbers of files, because overhead associated with initiation of antivirus scanning for each different antivirus software program is incurred only once for each batch of files, reducing the overall overhead across the batch of files. The system reduces idle time of computing units, and maintains a high overall rate of utilization of each computing unit by scanning the files using multiple different antivirus software programs in the batches created as the files are received. Additionally, by processing the files in batches rather than individually, the system reduces overhead associated with initialization of each antivirus program.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document generally describes techniques for analyzing high volumes of files using multiple antivirus software programs.

In some examples, a file analysis system includes multiple computing units. The file analysis system may receive files for analysis from users and use distributed computing to apportion analysis of files using multiple antivirus software programs, enabling high throughput of files. The files may be collectively processed in assigned batches to reduce initial processing overhead. In addition, the transfer and download of files may be coordinated to decrease latency between processing of batches.

Figure 1:
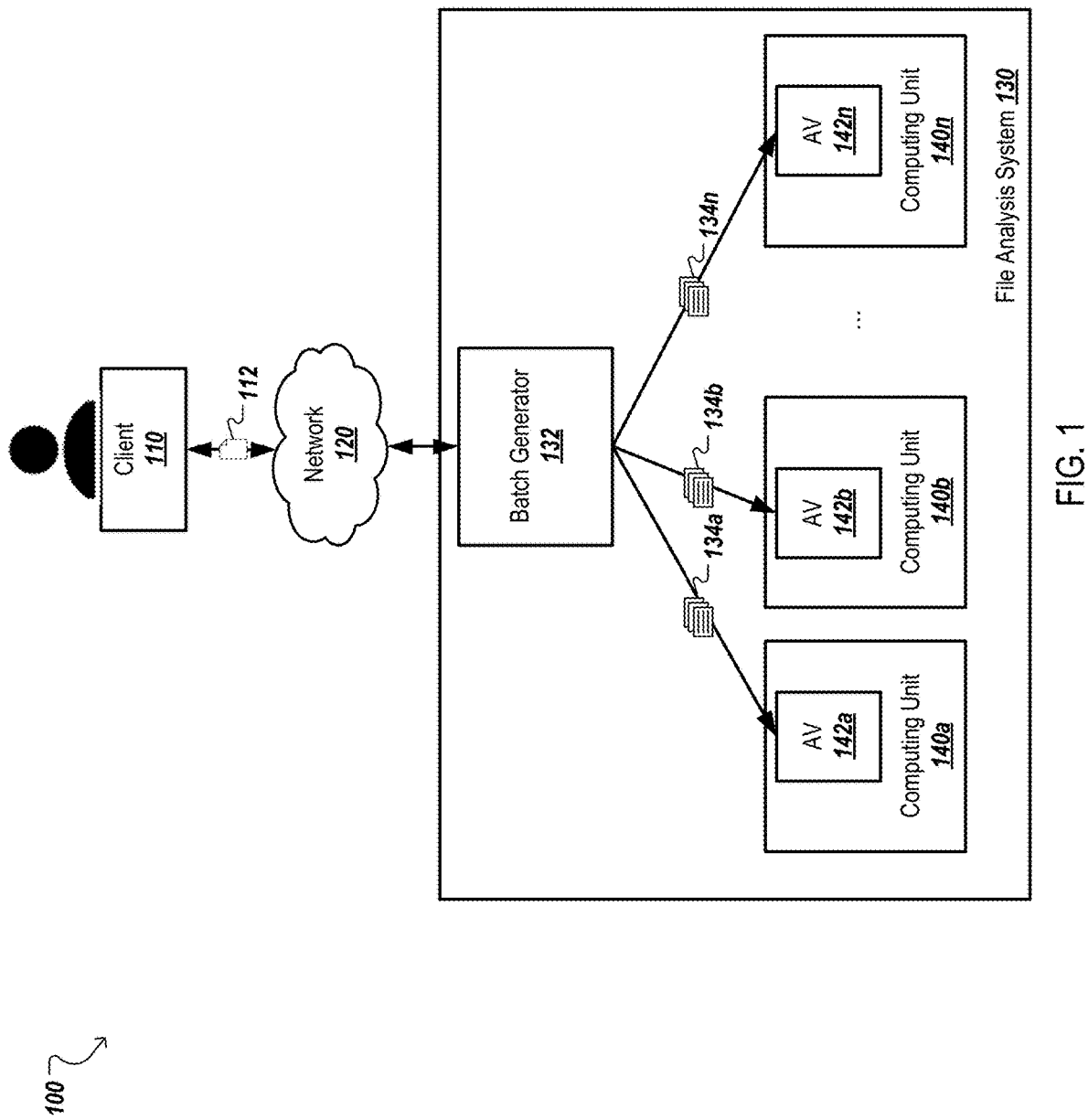
FIG. 1 is a system diagram that illustrates an example file analysis system that uses multiple different antivirus software programs.

FIG. 1 is a system diagram that illustrates an example high throughput file analysis system 100. The system 100 includes a client device 110 communicably connected to a network 120 and through which a user can submit files to be analyzed and receive the results of the analysis. The client device 110 is connected to a file analysis system 130 through the network 120, and may transmit one or more files 112 to the file analysis system 130 for processing.

The client device 110 may be an electronic device that is capable of requesting and receiving resources over the network 120. Example client devices 110 include personal computers, mobile communication devices, and other devices that can send and receive data over the network 120. A client device 110 typically includes a user application, such as a web browser, to facilitate the sending and receiving of data over the network 120, but native applications executed by the client device 110 can also facilitate the sending and receiving of data over the network 120.

The file 112 is an electronic resource that stores information, and can include a variety of content. The file 112 has a format defined by its content. The format of the file 112 may be indicated, for example, by a filename extension. The file 112 may include metadata, or data that provides information about the contents and/or attributes of the file 112. The file 112 can include, for example, static content (e.g., text or other specified content) that is within the file itself and/or does not change over time. The file 112 can also include dynamic content that may change over time or on a per-request basis. For example, a user who submits a file for analysis can maintain a data source that is used to populate portions of a separate electronic document. In this example, the given file can include one or more tags or scripts that cause the client device 110 to request content from the data source when the given file is processed (e.g., rendered or executed) by the client device 110. The client device 110 integrates the content obtained from the data source into the given electronic document, such as a web page, to create a composite electronic document including the content obtained from the data source. The file 112 can be any of various types of files, including multimedia audio and/or video, batch files, executable files, image files, text files, compressed files, class files, database files, or other file formats.

The network 120 can be a local area network (LAN), a wide area network (WAN), the Internet, or a combination thereof. The network 120 connects the client device 110 with the file analysis system 130. The network 120 may include 802.11 "Wi-Fi" wireless Ethernet (e.g., using low-power Wi-Fi chipsets), Bluetooth, networks that operate over AC wiring, or Category 5 (CAT5) or Category 6 (CAT6) wired Ethernet network.

The file analysis system 130 receives files for processing from users of the system 100 and provides antivirus outputs for the received files. The file analysis system 130 includes a batch generator 132 and multiple computing units 140a-140n. The file analysis system 130 analyzes each received file using multiple different antivirus software programs to detect malicious content. By using different antivirus software programs that may each use different detection techniques and algorithms, the file analysis system 130 reduces the amount of false negatives, in which malicious content is not detected, as well as false positives, in which benign content is flagged as containing malicious content. The file analysis system 130 may store the received files in a memory, such as a hard drive, a data store, etc.

The batch generator 132 receives files for processing from users of the system 100 and generates batches of files. The batch generator 132 creates batches by grouping together files as they are received by the file analysis system 130. The batch generator 132 may create batches using a queue of the received files formed by the file analysis system 130. The batch generator 132 may store the generated batches in a memory accessible by the computing units 140.

In some examples, the batch generator 132 creates batches of files of a fixed size.

In some other examples, the batch generator 132 creates batches of files of a dynamic size. For example, the batch generator 132 may create batches of files based on the bit rate of the communication medium through which the users submit files to the file analysis system 130. If the bit rate of a network over which users are submitting files to the file analysis system 130 decreases, the number of files included in a batch of files may be reduced. The batch generator 132 may generate batches of files based on various other factors, including the number of computing units 140 included in the file analysis system 130, the type of computing units 140, the number of users from which the file analysis unit 130 receives files, the time of day at which the files are received, and any other relevant factors. For example, the batch generator 132 may determine that the computing units 140 have at least a threshold amount of processing power and put a predetermined number of files in each batch, or increase the number of files in each batch generated as the number of users from which the file analysis unit 130 receives files increases.

Generally, the batches of files created do not share any of the same files, i.e., each file is only included in a single batch. For example, a first batch may include the first fifteen files received from users of the system 100, while a second batch includes the next six files received from users of the system 100. In some other examples, however, the batches of files created may share files.

The batch generator 132 generates a replica 134a-n of each batch for each of the computing units 140a-n of the file analysis system 130. A replica of a batch includes a copy of each of the files in the batch. The replicas 134 may be requested by the computing units 140. For example, the batch generator 132 may generate a batch and may generate replicas 134 based on when the batch is requested by a particular computing unit 140. The computing units 140 may request the replicas 134 for download and storage in a local storage medium for fast access. For example, the computing units 140a-n may each download a respective replica and store the replica in a volatile memory, such as random access memory (RAM) for fast access while scanning each file in the replica of the batch of files using the assigned antivirus software program.

A computing unit 140 may be, e.g., a computer, a core within a computer having multiple cores, or other hardware or software, e.g., a dedicated thread, within a computer capable of independently operating on a replica 134 of a batch. The computing units 140 may include processor cores, processors, microprocessors, special-purpose logic circuitry, e.g., an FPGA (field-programmable gate array) or an ASIC (application-specific integrated circuit), or any other appropriate computing units. In some examples, the computing units 140a-n are all the same type of computing unit. In other examples, the computing units 140a-n may be different types of computing units. For example, the computing unit 140a may be a single processor core while the computing units 140b-n may be FPGAs.

The computing units 140a-n are each assigned one or more antivirus software programs and use the assigned antivirus software programs to scan the files within each replica 134a-n of the batch generated by the batch generator 132. The antivirus software programs scan files to detect malware by using various detection techniques and algorithms. The antivirus software programs used by the computing units 140 may include various programs. The antivirus software programs assigned to the computing units 140 may be updated, reassigned, removed, added, etc. For example, as a new antivirus software program is developed, it may be added to the set of antivirus software programs used by the file analysis system 130. In some examples, each of the computing units 140a-n is assigned a separate, different antivirus software program. In other examples, the antivirus software program assignments may overlap between computing units 140.

In some examples, the file analysis system 130 uses fewer antivirus software programs than computing units 140 of the file analysis system 130. In such examples, some computing units 140 of the file analysis system 130 may not be assigned an antivirus software program. In some other examples, the number of antivirus software programs used by the file analysis system 130 is larger than the number of computing units 140 used by the file analysis system 130. In such examples, particular computing units 140 may be assigned multiple antivirus software programs. The file analysis system 130 may assign antivirus software programs to the computing units 140 based on various factors, including characteristics of the batches of files received, characteristics of the computing unit 140, and other relevant factors. For example, if a particular computing unit 140 is more powerful than the other computing units 140 of the file analysis system 130, the file analysis system 130 may assign multiple antivirus software programs to the particular computing unit 140 and one antivirus software program to each of the other computing units 140 of the file analysis system 130. Antivirus software programs may be assigned to the computing units 140 according to an algorithm, a pattern, or another method of assignment. For example, the antivirus software programs can be assigned to the computing units 140 in order so that once each computing unit 140 is assigned an antivirus software program, the file analysis system 130 begins assigning additional antivirus software programs to the computing units 140 such that the number of antivirus software programs assigned to each computing unit 140 is evenly distributed. The assignment of antivirus software programs to the computing units 140 of the file analysis system 130 may be dynamically updated.

Figure 2:
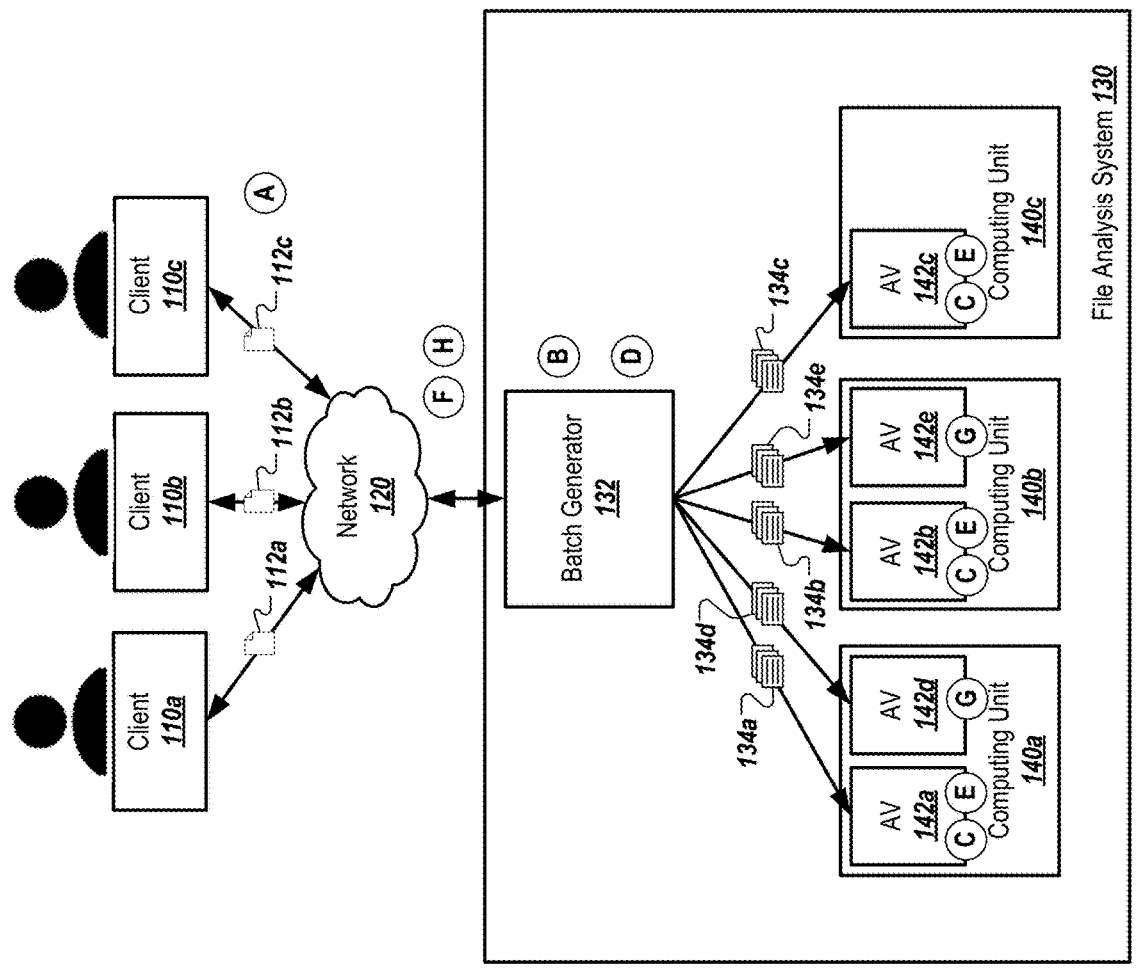
FIG. 2 is a system diagram that illustrates an example process for analyzing files using multiple different antivirus software programs.

FIG. 2 is a system diagram that illustrates an example of a process 200 for analyzing files. The process 200 may be performed by a system such as the high throughput file analysis system 100.

The process 200 spans stages (A) through (H). Stages (A) to (H) may occur in the illustrated sequence, or they may occur in a suitable sequence that is different from the illustrated sequence.

The process 200 begins with stage (A), in which users provide files 112a, 112b, and 112c to be analyzed through multiple client devices 110a, 110b, and 110c. In some examples, the users of the client devices 110 may submit multiple files 112 to be analyzed. The files are transmitted to the file analysis system 130 through the network 120.

The process 200 continues in stage (B) in which the file analysis system 130 receives the files provided for analysis and generates a batch of files from the received files using the batch generator 132. In some examples, the batch generator 132 receives the files provided for analysis and generates a batch of files from the received files. The batch generator 132 may generate one or more batches from the received files. For example, the batch generator 132 may generate one batch from all files received within a period of time, or the batch generator 132 may generate batches of a fixed size from the files received.

During stage (C), the computing units 140 request replicas 134 of the batch from the batch generator 132. The batch generator 132 may generate replicas 134 of the batch as the computing units 140 request the replicas 134. For example, the batch generator 132 may generate the replica 134b for the computing unit 140b when the computing unit 140b requests the replica, and generate the replica 134e later when the computing unit 140b requests the replica 134e. In some examples, the batch generator 132 may generate replicas 134 of the batch as soon as it generates the batch. The computing units 140 download the respective replicas 134. The computing units 140 download the respective replicas 134 to a memory accessible to the computing units 140 for fast access while the computing units 140 scan each file of the replica 134 using the antivirus software programs assigned to the particular computing unit 140. In some examples, the memory is a non-volatile memory; in other examples, the memory is a volatile memory. In some examples, the computing units 140 share a memory; in other examples, the computing units 140 each maintain a separate fast access memory.

In the particular example shown in FIG. 2, there are more antivirus software programs than there are computing units 140 of the file analysis system 130. That is, in this example, there are three computing units 140a-c, and five antivirus software programs, 142a, 142b, 142c, 142d, and 142e. The antivirus software programs are assigned to the computing units 140 such that each of the computing units 140 is assigned an antivirus software program, and then, beginning with the first computing unit 140a, the leftover antivirus software programs are assigned to the computing units 140 such that the number of antivirus software programs assigned to the computing units 140 is as evenly distributed as possible. In this particular example, the antivirus software program (AV) 142a is assigned to the computing unit 140a, the AV 142b is assigned to the computing unit 140b, and the AV 142c is assigned to the computing unit 140c. Because there are more AVs 142 than there are computing units 140, the remaining AVs are assigned to the computing units 140 such that they are as evenly distributed as possible. In this particular example, the AV 142d is assigned to the computing unit 140a, and the AV 142e is assigned to the computing unit 140b.

The antivirus software programs 142 can be assigned to the computing units 140 using different techniques. For example, the antivirus software programs 142 can be assigned to the computing units 140 based on the resource intensiveness of the particular antivirus software program 142. In some examples, the antivirus software programs 142 can be assigned to the computing units 140 based on the efficiency of the particular computing unit 140.

The computing units 140 then process each of the files in the replica of the batch to generate a respective program-specific antivirus output for the antivirus software program for each file in the replica of the batch. The respective program-specific antivirus output for a given software program contains an antivirus verdict, i.e., an indication of whether a file includes malicious content for each file in the replica of the batch as determined by the given antivirus software program. In some implementations, the indication is a binary indication that indicates whether the file does or does not contain malicious content. In other implementations, the indication may be in the form of scores for various portions of the file, an identification of the portions of the file that include malicious content, an identification of the type of malicious content the file contains, or any of various other indications of whether a file includes malicious content. The program-specific antivirus output may also include data characterizing the anti-virus software program, e.g., the name of the program, the version of the program, the version of the signature files being used by the program, and so on. In this particular example, the computing unit 140a processes each of the files in the replica 134a to generate an antivirus output for AV 142a, the computing unit 140b processes each of the files in the replica 134b to generate an antivirus output for AV 142b, etc., and the computing unit 140c processes each of the files in the replica 134c to generate an antivirus output for AV 142c. During stage (C), the computing units 140 scan the files in the respective replicas using the AVs 142a-c only.

During stage (D), the computing units 140 each request a replica of a next batch of files from the batch generator 132. In some examples, stage (D) occurs as soon as the replica 134 for the computing unit 140 is finished downloading. For example, as soon as the computing unit 140b finishes downloading the replica 134b, the computing unit 140b may request a replica of a next batch of files from the batch generator 132.

The processing of multiple files in batches reduces the delay incurred when scanning individual files using multiple, different antivirus software programs. In some examples, antivirus software programs use signature files that identify features of malware files for which the antivirus software program is scanning. The computing units 140 must download the signature files before using the signature files to scan the files. By scanning files in batches, the downtime experienced due to the download of the signature files for each antivirus software program is spread across multiple files.

By requesting the replicas of the next batch as soon as the replicas are finished downloading, the process 200 reduces latency between processing of consecutive batches. The batch generator 132 may begin generating replicas of the next batches while the computing units 140 are scanning the files of the batch and generating the program-specific antivirus output for each file.

Additionally, because the file analysis system 130 scans the replicas of the batches using multiple antivirus software programs simultaneously, the process 200 reduces the overall wait time for a user to receive the program-specific antivirus output for the files of the batch.

The file analysis system 130 provides antivirus outputs derived from the generated program-specific antivirus output for each file of the batch to the user. In some examples, if the file analysis system 130 uses more antivirus software programs 142 than computing units 140, the file analysis system 130 will provide the generated program-specific antivirus outputs for each file simultaneously. In this particular example, the file analysis system 130 uses five antivirus software programs 142. The file analysis system 130 may delay providing the program-specific antivirus outputs for the AVs 142a-c for a particular file until the outputs for all antivirus software programs, including for the AVs 142d and 142e, for the particular file are available. In some examples, the file analysis system 130 provides the program-specific antivirus outputs as the outputs are generated.

The process 200 continues with stage (E), in which the computing units 140 process each of the files in the replica of the batch to generate a respective program-specific antivirus output for the next antivirus software program assigned to the computing unit 140. In this example, the computing unit 140a processes each of the files in the replica 134d to generate an antivirus output for AV 142d, and the computing unit 140b processes each of the files in the replica 134e to generate an antivirus output for AV 142e.

The replicas 134d and 134e may be separate, different replicas from the replicas 134a and 134b. In some examples, the replicas 134d and 134e are the same replicas as the replicas 134a and 134b, and the computing units 140a and 140b use the same replicas for each batch across different antivirus software programs. For example, the computing unit 140a may process the replica 134a using the antivirus software program 142a and the antivirus software program 142d, and the computing unit 140b may process the replica 134b using the antivirus software program 142b and the antivirus software program 142e.

In some examples, stage (E) occurs at the same time as stage (D). For examples, stage (D) may occur while the computing units 140 are scanning each of the files in the replicas 142.

The process 200 continues with stage (F), in which the file analysis system 130 provides the program-specific antivirus output to the user through the network 120. In some examples, stage (F) can occur after stage (G); in other examples, stage (F) occurs before stage (G). In the particular situation illustrated in process 200, stage (F) may occur as soon as the program-specific antivirus outputs for the AVs 142*a-c* are generated. The program-specific antivirus outputs for the AVs 142*a-c* may be generated at different times. The file analysis system 130 may provide the program-specific antivirus outputs for each of the AVs 142 as soon as they are generated by the computing units 140*a-c*. In some examples, the file analysis system 130 delays providing the program-specific antivirus outputs for each of the AVs 142*a-c* until all of the program-specific antivirus outputs for the AVs 142*a-c* are available.

The process 200 continues with stage (G), in which the computing units 140 scan the files of the respective remaining replicas 134 to generate the program-specific antivirus outputs for the files. In the situation illustrated by the process 200, the computing units 140*a* and 140*b* scan the files of the respective remaining replicas 134*d* and 134*e* using the AVs 142*d* and 142*e* to generate program-specific antivirus outputs for the AVs. In some examples, stage (G) is similar to stage (E). In some examples, stage (G) is a repetition of stage (E). Stage (G) may include additional or different processes.

The process 200 continues with stage (H), in which the file analysis system 130 provides the program-specific antivirus outputs for each of the remaining AVs for the batch to the users through the network 120. In the situation illustrated by the process 200, the file analysis system 130 may provide the program-specific antivirus outputs for the AVs 142*d* and 142*e*. In some examples, stage (H) is similar to stage (F). In some examples, stage (H) is a repetition of stage (F); in other examples, stage (H) includes additional or different processes.

In some examples, the file analysis system 130 delays stage (F) until stage (H) occurs. In some examples, stage (F) occurs before stage (H) occurs. The file analysis system 130 may use more antivirus software programs than there are computing units 140; in such examples, the stages (C)-(F) may be repeated. The file analysis system 130 may use fewer antivirus software programs; in such examples, the stages (G)-(H) may be omitted.

Figure 3:
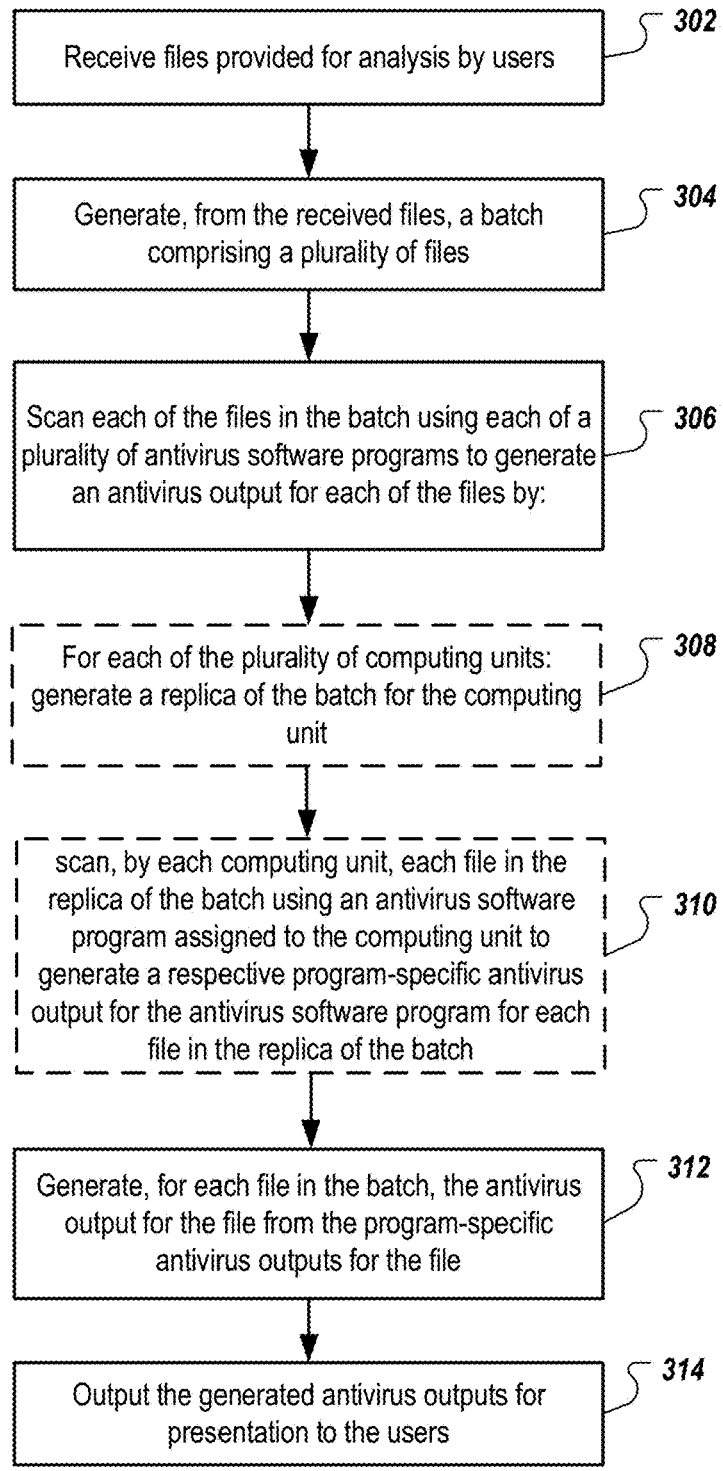
FIGS. 3-4 are flow diagrams that illustrate example processes for analyzing files using multiple different antivirus software programs.

FIG. 3 is a flowchart of an example process 300 for analyzing files. The process 300 may be performed by a system such as the file analysis system 130.

The system receives files provided for analysis by users (302). The file analysis system 130 may receive files provided for analysis by users of client devices 110 through the network 120.

The system generates, from the received files, a batch including multiple files (304). For example, the batch generator 132 of the file analysis system 130 may generate a batch including multiple files from the files received.

The system scans each of the files in the batch using each of a plurality of antivirus software programs to generate a respective antivirus output for each of the files (306). The file analysis system 130 may scan each of the files in the batch using each of a plurality of antivirus software programs 142 to generate a respective antivirus output for each of the files in the batch.

The scanning includes, for each of a plurality of computing units of the system, generating a replica of the batch for the computing unit (308). The batch generator 132 of the file analysis system 130 may generate a replica 134 of the batch for each of the computing units 140.

The scanning also includes, for each of the plurality of computing units of the system, scanning, by the computing unit, each file in the replica of the batch using an antivirus software program assigned to the computing unit to generate a respective program-specific antivirus output for the antivirus software program for each file in the replica of the batch (310). The computing units 140 may scan each file in the respective replica 134 of the batch using an AV 142 assigned to the computing unit 140 to generate a respective program-specific antivirus output for the AV 142 for each file in the replica 134 of the batch.

The system generates, for each file in the batch, the antivirus output for the file from the program-specific antivirus outputs for the file (312). The antivirus output for the file may include an indication of whether the file includes malicious content as determined by the multiple antivirus programs used to scan the file. The indication may be in the form of an overall confidence score of whether the file includes malicious content, an identification of the portions of the file that include malicious content, an identification of the type of malicious content the file contains, or any of various other indications of whether a file includes malicious content. For example, the file analysis system 130 may generate antivirus outputs for each file of the batch from the program-specific antivirus outputs for the file by providing a count of antivirus programs that indicated that the file includes malicious content vs. a total count of antivirus programs used to scan the file, averaging scores generated for the file in each of the program-specific antivirus outputs, by combining the indications of what type of malicious content the file contains, or by combining the program-specific antivirus outputs for the file in various other ways. The antivirus outputs may also include data characterizing all of the software programs used to scan the file or just the software programs that indicated that the file may include malicious content.

The system outputs the generated antivirus outputs for presentation to the users (314). For example, the file analysis system 130 may output the generated antivirus outputs for presentation to the users of the client devices 110 through the network 120. In some examples, the client devices 100 may, in addition to or instead of presenting the generated antivirus outputs to the user, respond to receipt of the generated antivirus outputs by taking action to remove, or otherwise neutralize, any files 112 that are indicated by the antivirus outputs as including malicious content.

Figure 4:
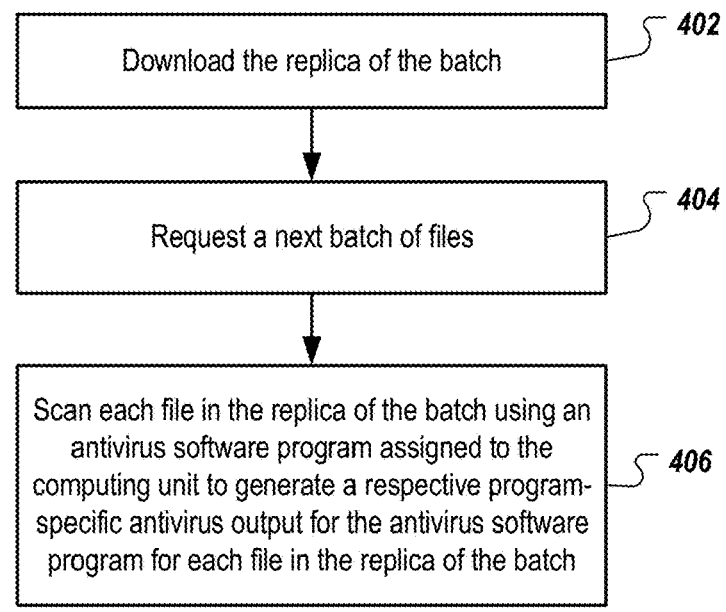

FIG. 4 is a flowchart of an example process 400 for analyzing files. The process 400 may be performed by computing units, such as the one or more computing units 140 of the file analysis system 130.

The computing unit downloads the particular replica of the batch for the computing unit (402). The computing units 140 may each download a particular replica 134 of the batch for the computing unit 140.

The computing unit requests a next batch of files (404). The computing unit requests a next batch of files as soon as its download of the replica of the batch is finished. The computing unit 140 may request a next batch of files from the batch generator 132.

The computing unit scans each file in the replica of the batch using an antivirus software program assigned to the computing unit to generate a respective program-specific antivirus output for the antivirus software program for each file in the replica of the batch (406). The computing unit 140 may scan each file in the replica 134 of the batch using an antivirus software program 142 assigned to the computing unit 140 to generate a respective program-specific antivirus output for the antivirus software program for each file in the replica 134 of the batch.

In some examples, the file analysis system 130 may use more antivirus software programs than computing units. In such examples, the process 400 may be repeated until program-specific antivirus outputs are generated for each of the antivirus software programs used by the file analysis system 130.

Figure 5:
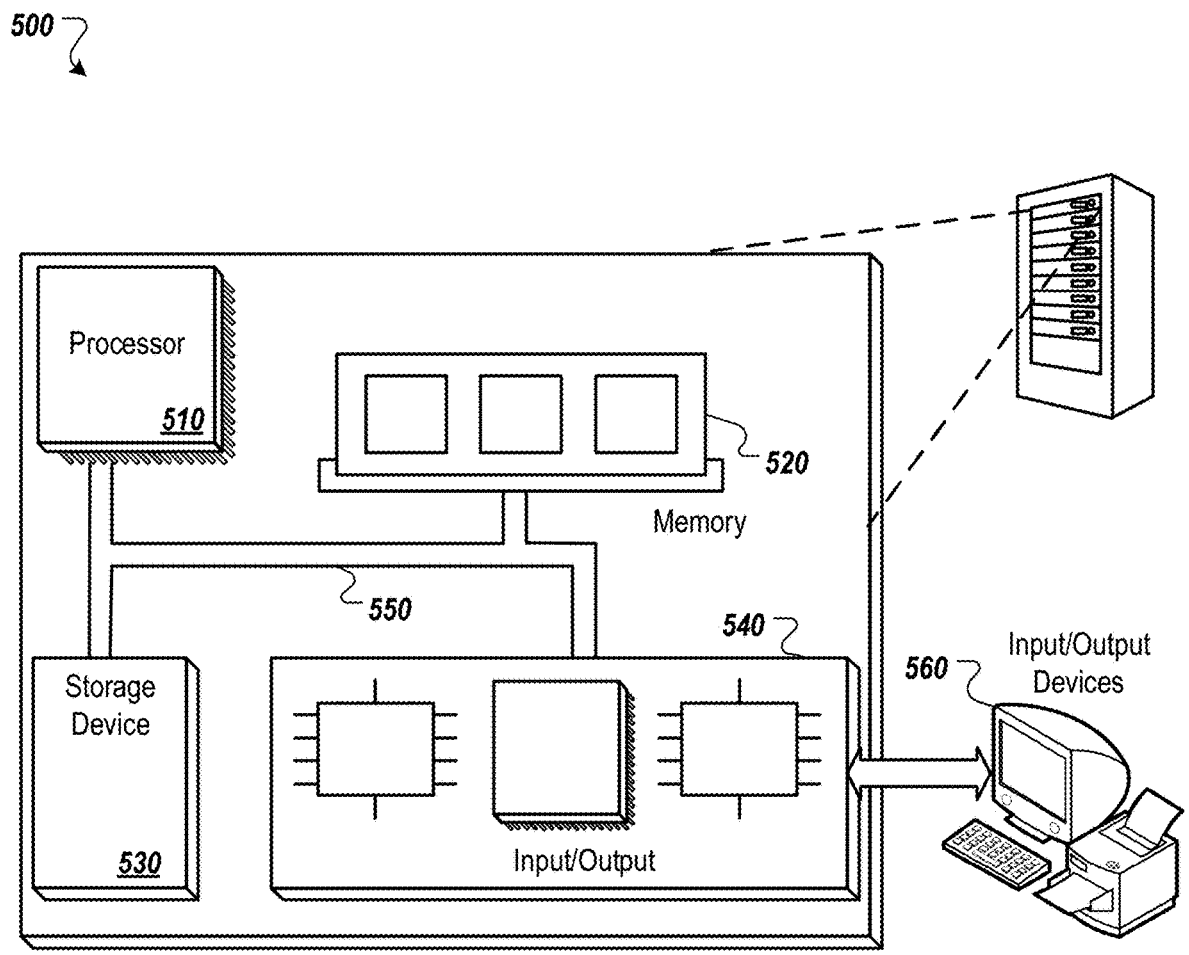
FIG. 5 is a block diagram of an example computing system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing units (e.g., a cloud storage device), or some other large capacity storage device.

The input/output device 540 provides input/output operations for the system 500. In one implementation, the input/output device 540 can include one or more network interface devices, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing units, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

This specification includes the following clauses:

1. A method of distributing processing in a file analysis system comprising a plurality of computing units, wherein the method comprises:
    receiving, by the file analysis system, files provided for analysis by users;
    generating, by the file analysis system and from the received files, a batch comprising a plurality of files;
    scanning, by the file analysis system, each of the files in the batch using each of a plurality of antivirus software programs to generate an antivirus output for each of the files, comprising:
        for each of the plurality of computing units:
            generating a replica of the batch for the computing unit;
            scanning, by the computing unit, each file in the replica of the batch using an antivirus software program assigned to the computing unit to generate a respective program-specific antivirus output for the antivirus software program for each file of the batch of files; and
        generating, by the file analysis system and for each file in the batch, the antivirus output for the file from the program-specific antivirus outputs for the file; and
    outputting, by the file analysis system, the generated antivirus outputs for presentation to the users.

2. The method of clause 1, wherein the plurality of computing units are processor cores.

3. The method of any one of clauses 1-2, wherein scanning each of the files in the batch using each of a plurality of antivirus software programs to generate an antivirus output for each of the files, further comprises:

for each of the plurality of computing units:

requesting, by the computing unit and while the computing unit is scanning the replica of the batch, a replica of a next batch of files different from the batch.

4. The method of clause 3, wherein:

scanning, by the computing unit, each file in the replica of the batch using an antivirus software program assigned to the computing unit to generate a respective program-specific antivirus output for the antivirus software program for each file of the batch of files comprises downloading the replica of the batch to the computing unit; and requesting, by the computing unit and while the computing unit is scanning the replica of the batch, a replica of a next batch of files different from the batch comprises requesting in response to determining that the downloading of the replica of the batch has finished.

5. The method of any one of clauses 4, wherein the next batch of files is generated from files in a queue generated by the file analysis system.

6. The method of any one of clauses 1-5, wherein a number of the plurality of computing units is less than a number of the plurality of antivirus software programs, and wherein scanning each of the files in the batch using each of a plurality of antivirus software programs to generate a respective antivirus output for each of the files, further comprises:

for a particular computing unit:

after scanning, by the particular computing unit, using the antivirus software program assigned to the computing unit, scanning, by the particular computing unit, each file in the replica of the batch using a second antivirus software program assigned to the computing unit different from the antivirus software program assigned to the computing unit to generate a respective program-specific antivirus output for the second antivirus software program for each file of the batch of files.

7. The method of any one of clauses 1-6, wherein a memory of the file analysis system is a volatile memory, wherein the replica of the batch for the computing unit is stored in the volatile memory, and wherein scanning, by the computing unit, each file in the replica of the batch using an antivirus software program assigned to the computing unit to generate a respective program-specific antivirus output for the antivirus software program for each file of the batch of files comprises:

accessing, from the volatile memory of the file analysis system, the replica of the batch for the computing unit; and scanning, by the computing unit, each file in the replica of the batch using the antivirus software program assigned to the computing unit to generate a respective program-specific antivirus output.

8. The method of clause 7, wherein the received files are stored in a memory of the file analysis system different from the volatile memory.

9. The method of any one of clauses 7 or 8, wherein the program-specific antivirus output includes, for each file and for each antivirus program, (i) an antivirus verdict generated by the antivirus program, and (ii) metadata characterizing the antivirus program.

10. A file analysis system comprising:

one or more computers; and one or more storage devices storing instructions that when executed by the one or more computers cause the one or more computers to perform operations comprising:

receiving, by the file analysis system, files provided for analysis by users;

generating, by the file analysis system and from the received files, a batch comprising a plurality of files;

scanning, by the file analysis system, each of the files in the batch using each of a plurality of antivirus software programs to generate an antivirus output for each of the files, comprising:

for each of a plurality of computing units:

generating a replica of the batch for the computing unit; and scanning, by the computing unit, each file in the replica of the batch using an antivirus software program assigned to the computing unit to generate a respective program-specific antivirus output for the antivirus software program for each file of the batch of files;

generating, by the file analysis system and for each file in the batch, the antivirus output for the file from the program-specific antivirus outputs for the file; and outputting, by the file analysis system, the generated antivirus outputs for presentation to the users.

11. The system of clause 10, wherein the plurality of computing units are computer cores.

12. The system of any one of clauses 10-11, wherein scanning each of the files in the batch using each of a plurality of antivirus software programs to generate an antivirus output for each of the files, further comprises:

for each of the plurality of computing units:

requesting, by the computing unit and while the computing unit is scanning the replica of the batch, a replica of a next batch of files different from the batch.

13. The system of clause 12, wherein:

scanning, by the computing unit, each file in the replica of the batch using an antivirus software program assigned to the computing unit to generate a respective program-specific antivirus output for the antivirus software program for each file of the batch of files comprises downloading the replica of the batch to the computing unit; and requesting, by the computing unit and while the computing unit is scanning the replica of the batch, a replica of a next batch of files different from the batch comprises requesting in response to determining that the downloading of the replica of the batch has finished.

14. The system of clause 13, wherein the next batch of files is generated from files in a queue generated by the file analysis system.

15. The system of any one of clauses 10-14, wherein a number of the plurality of computing units is less than a number of the plurality of antivirus software programs, and wherein scanning each of the files in the batch using each of a plurality of antivirus software programs to generate a respective antivirus output for each of the files, further comprises:

for a particular computing unit:

after scanning, by the particular computing unit, using the antivirus software program assigned to the computing unit, scanning, by the particular computing unit, each file in the replica of the batch using a second antivirus software program assigned to the computing unit different from the antivirus software program assigned to the computing unit to generate a respective program-specific antivirus output for the second antivirus software program for each file of the batch of files.

16. The system of any one of clauses 10-15, wherein a memory of the file analysis system is a volatile memory, wherein the replica of the batch for the computing unit is stored in the volatile memory, and wherein scanning, by the computing unit, each file in the replica of the batch using an antivirus software program assigned to the computing unit to generate a respective program-specific antivirus output for the antivirus software program for each file of the batch of files comprises:

accessing, from the volatile memory of the file analysis system, the replica of the batch for the computing unit; and scanning, by the computing unit, each file in the replica of the batch using the antivirus software program assigned to the computing unit to generate a respective program-specific antivirus output.

17. The system of clause 16, wherein the received files are stored in a memory of the file analysis system different from the volatile memory.

18. The system of any one of clauses 16 or 17, wherein the program-specific antivirus output includes, for each file and for each antivirus program, (i) an antivirus verdict generated by the antivirus program, and (ii) metadata characterizing the antivirus program.

19. One or more non-transitory computer readable media storing instructions that when executed by one or more computers cause the one or more computers to perform operations comprising:

receiving, by a file analysis system, files provided for analysis by users;

generating, by the file analysis system and from the received files, a batch comprising a plurality of files;

scanning, by the file analysis system, each of the files in the batch using each of a plurality of antivirus software programs to generate an antivirus output for each of the files, comprising:

for each of a plurality of computing units:
generating a replica of the batch for the computing unit; and
scanning, by the computing unit, each file in the replica of the batch using an antivirus software program assigned to the computing unit to generate a respective program-specific antivirus output for the antivirus software program for each file of the batch of files;

generating, by the file analysis system and for each file in the batch, the antivirus output for the file from the program-specific antivirus outputs for the file; and outputting, by the file analysis system, the generated antivirus outputs for presentation to the users.

20. The computer readable media of clause 19, wherein the plurality of computing units are computer cores.

What is claimed is:

1. A method of distributing processing in a file analysis system comprising a plurality of computing units, wherein the method comprises:

receiving into a queue, by the file analysis system, files provided for analysis by users, each of the users providing the files from a respective user device, and each user device being different from each other user device;

generating, by the file analysis system and from the received files, a plurality of batches, each batch in the plurality of batches comprising a plurality of files, the plurality of files being files selected from the files in the queue provided by the users;

for each batch of the plurality of batches:
scanning, by the file analysis system, each of the files in the batch using each of a plurality of antivirus software programs to generate an antivirus output for each of the files, comprising:
for each computing unit of the plurality of computing units:
generating a replica of the batch for the computing unit, wherein the replica generated for the computing unit is i) separate from each other replica generated for each other computing unit; and ii) a copy of the batch that is the same as each other replica generated for each other computing unit;
downloading the replica of the batch to the computing unit;
scanning, by the computing unit, each file in the replica of the batch using an antivirus software program assigned to the computing unit and different from antivirus software programs assigned to the other computing units to generate a respective program-specific antivirus output for the antivirus software program for each file of the batch of files;
requesting, by the computing unit and while the computing unit is scanning the replica of the batch, a replica of a next batch of files different from the batch in response to determining that the downloading of the replica of the batch has finished; and
generating, by the file analysis system and for each file in the batch, the antivirus output for the file from the program-specific antivirus outputs for the file; and
outputting, by the file analysis system, the generated antivirus outputs for presentation to the users.

2. The method of claim 1, wherein the plurality of computing units are processor cores.

3. The method of claim 1, wherein scanning each of the files in the batch using each of a plurality of antivirus software programs to generate an antivirus output for each of the files, further comprises:

for each of the plurality of computing units:
requesting, by the computing unit and while the computing unit is scanning the replica of the batch, a replica of a next batch of files different from the batch.

4. The method of claim 1, wherein a number of the plurality of computing units is less than a number of the plurality of antivirus software programs, and wherein scanning each of the files in the batch using each of a plurality of antivirus software programs to generate a respective antivirus output for each of the files, further comprises:

for a particular computing unit:
after scanning, by the particular computing unit, using the antivirus software program assigned to the computing unit, scanning, by the particular computing unit, each file in the replica of the batch using a second antivirus software program assigned to the computing unit different from the antivirus software program assigned to the computing unit to generate a respective program-specific antivirus output for the second antivirus software program for each file of the batch of files.

5. The method of claim 1, wherein a memory of the file analysis system is a volatile memory, wherein the replica of the batch for the computing unit is stored in the volatile memory, and wherein scanning, by the computing unit, each file in the replica of the batch using an antivirus software program assigned to the computing unit to generate a respective program-specific antivirus output for the antivirus software program for each file of the batch of files comprises:
    accessing, from the volatile memory of the file analysis system, the replica of the batch for the computing unit; and
    scanning, by the computing unit, each file in the replica of the batch using the antivirus software program assigned to the computing unit to generate a respective program-specific antivirus output.

6. The method of claim 5, wherein the received files are stored in a memory of the file analysis system different from the volatile memory, and/or wherein the program-specific antivirus output includes, for each file and for each antivirus program, (i) an antivirus verdict generated by the antivirus program, and (ii) metadata characterizing the antivirus program.

7. The method of claim 1, wherein generating a batch comprising a plurality of files comprises generating a batch that includes a proper subset of the files provided by the users.

8. A file analysis system comprising:
one or more computers; and
one or more storage devices storing instructions that when executed by the one or more computers cause the one or more computers to perform operations comprising:
    receiving into a queue, by the file analysis system, files provided for analysis by users, each of the users providing the files from a respective user device, and each user device being different from each other user device;
    generating, by the file analysis system and from the received files, a plurality of batches, each batch in the plurality of batches comprising a plurality of files, the plurality of files being files selected from the files in the queue provided by the users;
    for each batch of the plurality of batches:
        scanning, by the file analysis system, each of the files in the batch using each of a plurality of antivirus software programs to generate an antivirus output for each of the files, comprising:
        for each computing unit of the plurality of computing units:
            generating a replica of the batch for the computing unit, wherein the replica generated for the computing unit is i) separate from each other replica generated for each other computing unit; and ii) a copy of the batch that is the same as each other replica generated for each other computing unit;
            downloading the replica of the batch to the computing unit;
            scanning, by the computing unit, each file in the replica of the batch using an antivirus software program assigned to the computing unit and different from antivirus software programs assigned to the other computing units to generate a respective program-specific antivirus output for the antivirus software program for each file of the batch of files;
            requesting, by the computing unit and while the computing unit is scanning the replica of the batch, a replica of a next batch of files different from the batch in response to determining that the downloading of the replica of the batch has finished; and
        generating, by the file analysis system and for each file in the batch, the antivirus output for the file from the program-specific antivirus outputs for the file; and
        outputting, by the file analysis system, the generated antivirus outputs for presentation to the users.

9. The system of claim 8, wherein the plurality of computing units are computer cores.

10. The system of claim 8, wherein scanning each of the files in the batch using each of a plurality of antivirus software programs to generate an antivirus output for each of the files, further comprises:
    for each of the plurality of computing units:
        requesting, by the computing unit and while the computing unit is scanning the replica of the batch, a replica of a next batch of files different from the batch.

11. The system of claim 8, wherein a number of the plurality of computing units is less than a number of the plurality of antivirus software programs, and wherein scanning each of the files in the batch using each of a plurality of antivirus software programs to generate a respective antivirus output for each of the files, further comprises:
    for a particular computing unit:
        after scanning, by the particular computing unit, using the antivirus software program assigned to the computing unit, scanning, by the particular computing unit, each file in the replica of the batch using a second antivirus software program assigned to the computing unit different from the antivirus software program assigned to the computing unit to generate a respective program-specific antivirus output for the second antivirus software program for each file of the batch of files.

12. The system of claim 8, wherein a memory of the file analysis system is a volatile memory, wherein the replica of the batch for the computing unit is stored in the volatile memory, and wherein scanning, by the computing unit, each file in the replica of the batch using an antivirus software program assigned to the computing unit to generate a respective program-specific antivirus output for the antivirus software program for each file of the batch of files comprises:
    accessing, from the volatile memory of the file analysis system, the replica of the batch for the computing unit; and
    scanning, by the computing unit, each file in the replica of the batch using the antivirus software program assigned to the computing unit to generate a respective program-specific antivirus output.

13. The system of claim 12, wherein the received files are stored in a memory of the file analysis system different from the volatile memory, and/or wherein the program-specific antivirus output includes, for each file and for each antivirus program, (i) an antivirus verdict generated by the antivirus program, and (ii) metadata characterizing the antivirus program.

14. The system of claim 8, wherein generating a batch comprising a plurality of files comprises generating a batch that includes a proper subset of the files provided by the users.

15. A non-transitory computer-readable medium storing software comprising instructions executable by one or more computers which, upon such execution, cause the one or more computers to perform operations comprising:

receiving into a queue, by the file analysis system, files provided for analysis by users, each of the users providing the files from a respective user device, and each user device being different from each other user device;

generating, by the file analysis system and from the received files, a plurality of batches, each batch in the plurality of batches comprising a plurality of files, the plurality of files being files selected from the files in the queue provided by the users;

for each batch of the plurality of batches:

scanning, by the file analysis system, each of the files in the batch using each of a plurality of antivirus software programs to generate an antivirus output for each of the files, comprising:

for each computing unit of the plurality of computing units:

generating a replica of the batch for the computing unit, wherein the replica generated for the computing unit is i) separate from each other replica generated for each other computing unit; and ii) a copy of the batch that is the same as each other replica generated for each other computing unit;

downloading the replica of the batch to the computing unit;

scanning, by the computing unit, each file in the replica of the batch using an antivirus software program assigned to the computing unit and different from antivirus software programs assigned to the other computing units to generate a respective program-specific antivirus output for the antivirus software program for each file of the batch of files;

requesting, by the computing unit and while the computing unit is scanning the replica of the batch, a replica of a next batch of files different from the batch in response to determining that the downloading of the replica of the batch has finished; and generating, by the file analysis system and for each file in the batch, the antivirus output for the file from the program-specific antivirus outputs for the file; and outputting, by the file analysis system, the generated antivirus outputs for presentation to the users.

16. The computer-readable medium of claim 15, wherein the plurality of computing units are processor cores.

17. The computer-readable medium of claim 15, wherein scanning each of the files in the batch using each of a plurality of antivirus software programs to generate an antivirus output for each of the files, further comprises:

for each of the plurality of computing units:

requesting, by the computing unit and while the computing unit is scanning the replica of the batch, a replica of a next batch of files different from the batch.

18. The computer-readable medium of claim 15, wherein a number of the plurality of computing units is less than a number of the plurality of antivirus software programs, and wherein scanning each of the files in the batch using each of a plurality of antivirus software programs to generate a respective antivirus output for each of the files, further comprises:

for a particular computing unit:

after scanning, by the particular computing unit, using the antivirus software program assigned to the computing unit, scanning, by the particular computing unit, each file in the replica of the batch using a second antivirus software program assigned to the computing unit different from the antivirus software program assigned to the computing unit to generate a respective program-specific antivirus output for the second antivirus software program for each file of the batch of files.

19. The computer-readable medium of claim 15, wherein a memory of the file analysis system is a volatile memory, wherein the replica of the batch for the computing unit is stored in the volatile memory, and wherein scanning, by the computing unit, each file in the replica of the batch using an antivirus software program assigned to the computing unit to generate a respective program-specific antivirus output for the antivirus software program for each file of the batch of files comprises:

accessing, from the volatile memory of the file analysis system, the replica of the batch for the computing unit; and scanning, by the computing unit, each file in the replica of the batch using the antivirus software program assigned to the computing unit to generate a respective program-specific antivirus output.

20. The computer-readable medium of claim 13, wherein generating a batch comprising a plurality of files comprises generating a batch that includes a proper subset of the files provided by the users.

* * * * *